United States Patent
Yamasaki et al.

(10) Patent No.: US 8,308,875 B2
(45) Date of Patent: Nov. 13, 2012

(54) HIGH-STRENGTH WIRE ROD EXCELLENT IN DRAWING CHARACTERISTICS AND METHOD OF MANUFACTURING THE SAME

(75) Inventors: Shingo Yamasaki, Tokyo (JP); Seiki Nishida, Tokyo (JP); Makio Kikuchi, Tokyo (JP)

(73) Assignee: Nippon Steel Corporation, Tokyo (JP)

( * ) Notice: Subject to any disclaimer, the term of this patent is extended or adjusted under 35 U.S.C. 154(b) by 181 days.

(21) Appl. No.: 11/922,154

(22) PCT Filed: Apr. 18, 2007

(86) PCT No.: PCT/JP2007/058889
§ 371 (c)(1),
(2), (4) Date: Dec. 12, 2007

(87) PCT Pub. No.: WO2008/044354
PCT Pub. Date: Apr. 17, 2008

(65) Prior Publication Data
US 2009/0277545 A1    Nov. 12, 2009

(30) Foreign Application Priority Data
Oct. 12, 2006    (JP) .................................. 2006-278780

(51) Int. Cl.
*C22C 38/02* (2006.01)
(52) U.S. Cl. ......... 148/330; 148/320; 148/595; 148/598
(58) Field of Classification Search .................. 148/320, 148/330, 332–336, 595, 598–600
See application file for complete search history.

(56) References Cited

U.S. PATENT DOCUMENTS

| | | | |
|---|---|---|---|
| 2003/0066575 A1 * | 4/2003 | Nagao et al. | 148/320 |
| 2006/0048864 A1 | 3/2006 | Nagao et al. | |

FOREIGN PATENT DOCUMENTS

| | | | |
|---|---|---|---|
| EP | 1589124 A1 * | 10/2005 | |
| JP | 6-49592 | 2/1994 | |
| JP | 08-003639 | 1/1996 | |

(Continued)

OTHER PUBLICATIONS

Machine translation of JP 2004091912 A.*

(Continued)

*Primary Examiner* — Stanley Silverman
*Assistant Examiner* — Brian Walck
(74) *Attorney, Agent, or Firm* — Kenyon & Kenyon LLP

(57) ABSTRACT

The invention provides wire rod excellent in drawability and steel wire made from the wire rod as starting material with high productivity at good yield and low cost. A hard steel wire rod of a specified composition is hot rolled, the hot-rolled steel is coiled in a specified temperature range, and the coiled steel is subjected to patenting at a predetermined cooling rate, thereby affording a high-carbon steel wire excellent in workability. It is high-strength steel wire excellent in drawability comprising a pearlite structure of an area ratio of 97% or greater and the balance of non-pearlite structures including bainite, degenerate-pearlite and pro-eutectoid ferrite and having a pearlite block size of not less than 20 μm and not greater than 45 μm. The invention also provides a high-carbon steel wire excellent in ductility, which is manufactured by subjecting the wire rod to intermediate patenting and cold drawing and has a tensile strength of 2800 MPa or greater.

7 Claims, 2 Drawing Sheets

FOREIGN PATENT DOCUMENTS

| | | |
|---|---|---|
| JP | 8-3639 | 1/1996 |
| JP | 2609387 | 2/1997 |
| JP | 2609387 B | 5/1997 |
| JP | 2000-119805 | 4/2000 |
| JP | 2001-131697 | 5/2001 |
| JP | 2001-131697 A | 5/2001 |
| JP | 2003-082434 | 3/2003 |
| JP | 2004-91912 | 3/2004 |
| JP | 2005-126765 | 5/2005 |
| JP | 3681712 | 8/2005 |
| KR | 2005-052767 | 6/2005 |
| KR | 2005-057267 | 6/2005 |

OTHER PUBLICATIONS

Napolitano, R.E. "Measurement of ASTM Grain Size Number." Materials Science & Engineering, Iowa State University. Accessed Feb. 2, 2010.*

Korean Office Action dated Oct. 29, 2009, issued in corresponding Korean Patent Application No. 10-2007-7030483.

* cited by examiner

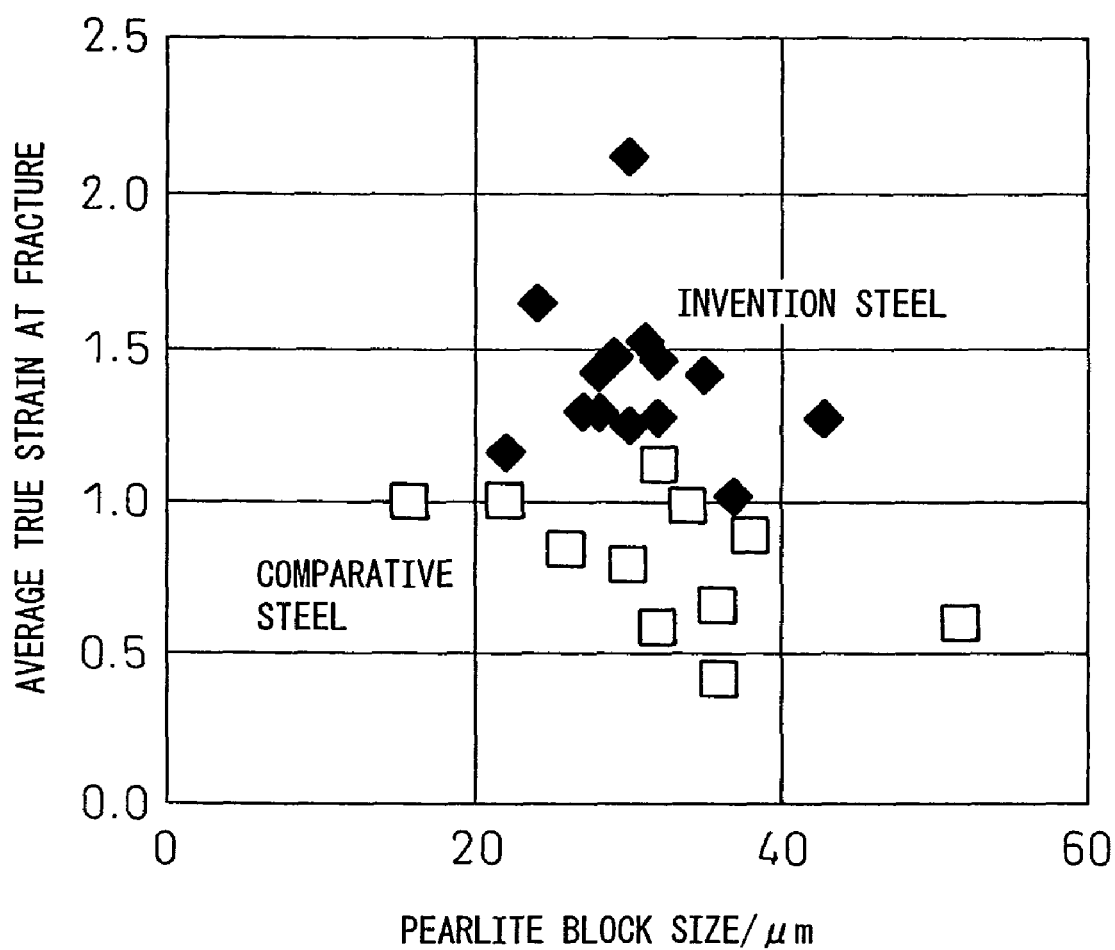

HIGH-STRENGTH WIRE ROD EXCELLENT IN DRAWING CHARACTERISTICS AND METHOD OF MANUFACTURING THE SAME

FIELD OF THE INVENTION

This invention relates to steel wire rod, steel wire, and a method of manufacturing the steel wire rod and steel wire. More particularly, this invention relates to steel cord used, for example, to reinforce radial tires, various types of industrial belts, and the like, to rolled wire rod suitable for use in applications such as sewing wire, to methods of manufacturing the foregoing, and to steel wire manufactured from the aforesaid rolled wire rod as starting material.

DESCRIPTION OF THE RELATED ART

In the case of steel wire for steel cord used as a material for reinforcing vehicle radial tires and various types of belts and hoses, or steel wire for sewing wire applications, the general practice is to subject a hot-rolled and controlled-cooling steel wire rod of 4-6 mm diameter to primary drawing for reducing it to a diameter of 3-4 mm, and then to subject the drawn wire rod to intermediate patenting and conduct secondary drawing for reducing it to a diameter of 1-2 mm. Final patenting is then performed, followed by brass plating and final wet drawing to a diameter of 0.15-0.40 mm. A number of extra fine steel wires obtained by this process are twisted into stranded cable, thereby fabricating steel cord.

In order to lower manufacturing costs, it has become an increasingly common practice in recent years to omit the aforesaid intermediate patenting and directly draw the controlled-cooling rolled wire rod to the final patenting diameter of 1 to 2 mm. This has created a need for the controlled-cooling rolled wire rod to exhibit good direct drawing characteristics, i.e., "drawability," so that demand for high ductility and high workability of wire rod has become very strong.

Reduction of area, one index of patented wire rod ductility, is a function of austenite grain size, and since this makes it possible to improve reduction of area by refining the austenite grain size, attempts have been made to achieve austenite grain size refinement by using carbides and/or nitrides of elements such as Nb, Ti and B as pinning particles. Japanese Patent No. 2609387 teaches further improvement of extra fine wire rod toughness/ductility by incorporation of one or more of Nb: 0.01-0.1 mass %, Zr: 0.05-0.1 mass % and Mo: 0.02 to 0.5 mass % as constituent elements. In addition, Japanese Patent Publication (A) No. 2001-131697 teaches austenite grain size refinement using NbC. However, the high price of these addition elements increases cost. Moreover, Ni forms coarse carbide and nitride and Ti forms coarse oxide, so that when the wire is drawn to a fine diameter of, for example, 0.40 mm or less, breakage may occur. A study carried out by the inventors found that BN pinning is not readily capable of refining austenite grain size to a degree that affects the reduction of area.

Further, Japanese Patent Publication (A) No. H8-3639 teaches enhancement of high-carbon wire rod drawability by adopting a lower patenting temperature for adjusting the wire rod structure to bainite. However, in-line bainitizing of rolled wire rod is likely to increase cost to a high level because it requires immersion in molten salt or the like and is also liable to degrade mechanical descaling ability.

SUMMARY OF THE INVENTION

The present invention was conceived in light of the foregoing circumstances. Its object is to provide high-strength wire rod excellent in drawability that is ideal for steel cord and sewing wire and similar applications with high productivity at good yield and low cost.

This invention achieves the foregoing object by a method of manufacture constituted to enable production of the steel wire set forth in aspect 1) below and the steel for steel wire set out in aspects 2) and 3) below, and establishment of the method of producing steel wire rod set forth in aspect 4) below, and the method of manufacturing high-strength steel wire set out in aspect 5) below.

1) A high-strength steel wire rod excellent in drawability comprising a pearlite structure of an area ratio of 97% or greater and a balance of non-pearlite structures including bainite, degenerate-pearlite and pro-eutectoid ferrite and having a pearlite block size of not less than 20 μm and not greater than 45 μm.

2) A high-strength steel wire rod according to 1), comprising, in mass %
  C: 0.70 to 1.10%,
  Si: 0.1 to 1.5%,
  Mn: 0.1 to 1.0%
  Al: 0.01% or less,
  Ti: 0.01% or less,
  N: 10 to 60 mass ppm,
  B: not less than (0.77×N (mass ppm)−17.4) mass ppm or 5 mass ppm, whichever is greater, and not greater than 52 mass ppm, and
  the balance of Fe and unavoidable impurities.

3) A high-strength steel wire rod according to 2), further comprising, in mass %, one or more members selected from the group consisting of:
  Cr: 0.03 to 0.5%,
  Ni: 0.5% or less (not including 0%),
  Co: 0.5% or less (not including 0%),
  V: 0.03 to 0.5%,
  Cu: 0.2% or less (not including 0%),
  Mo: 0.2% or less (not including 0%),
  W: 0.2% or less (not including 0%), and
  Nb: 0.1% or less (not including 0%).

4) A method of manufacturing the high-strength steel wire rod according to 2) or 3), comprising:
  hot rolling a steel billet having the chemical composition of 2) or 3),
  coiling the hot-rolled steel in the temperature range between Tmin shown below and 950° C., and
  subjecting the coiled steel to patenting using a cooling method in which a cooling rate between 800 and 600° C. is 5° C./s or greater, Tmin being 800° C. when $B$(mass ppm)−0.77×$N$(mass ppm)>0.0, and Tmin being Tmin=950+1450/($B$(mass ppm)−0.77× $N$(mass ppm)−10)° C. when $B$(mass ppm)−0.77× $N$(mass ppm)≦0.0.

5) A high-carbon steel wire excellent in ductility, which is manufactured by subjecting the steel wire rod of any of 1) to 3) to intermediate patenting and cold drawing and has a tensile strength (TS) of 2800 MPa or greater.

BRIEF DESCRIPTION OF THE DRAWINGS

FIG. 3 is a diagram showing how average true strain at fracture by drawing varied as a function of pearlite block size.

DETAILED DESCRIPTION OF THE INVENTION

Figure 1:
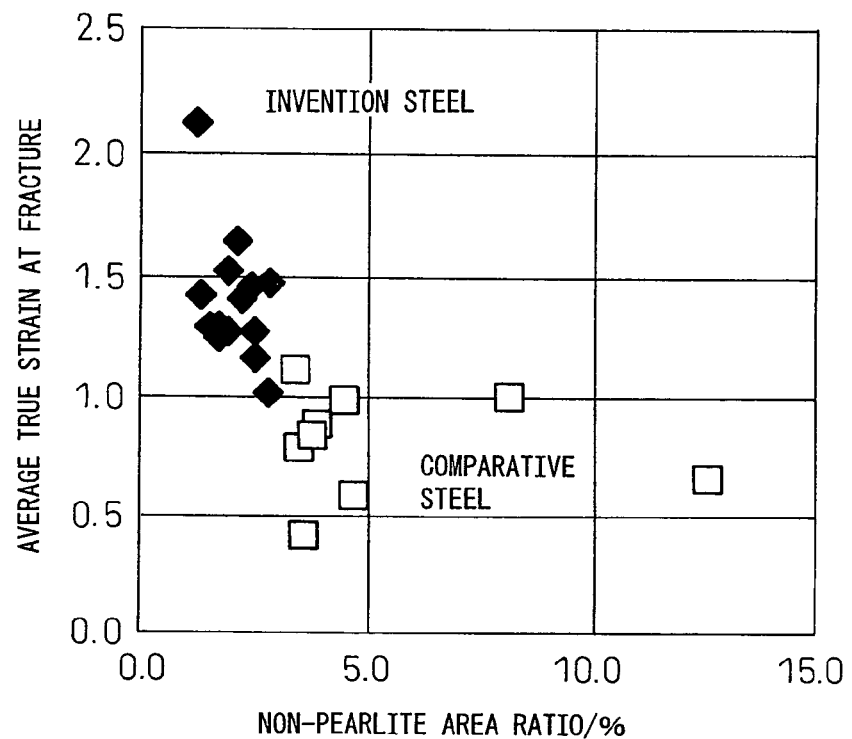
FIG. 1 is a diagram showing how average true strain at fracture by drawing varied as a function of non-pearlite area ratio.

The inventors conducted studies regarding how the chemical composition and mechanical properties of a wire rod affect its drawability. Their findings are set out below.
a) Although tensile strength can be enhanced by increasing the content of alloying metals such as C, Si, Mn and Cr, a higher content of these alloying metals lowers drawability, namely, increases breakage frequency by causing a reduction in working limit during drawing.
b) Drawability exhibits good correlation with tensile strength and fracture reduction of area before drawing, i.e., after heat treatment, and very good drawability is obtained when reduction of area reaches or exceeds a certain value in correspondence to tensile strength.
c) B forms a compound with N, and the amount of solid-solute B is determined by the total amounts of B and N and the heating temperature before pearlite transformation. Solid-solute B segregates at austenite grain boundaries. During cooling from the austenite temperature at the time of patenting, it inhibits generation of coarse, low-strength microstructures such as bainite, ferrite and degenerate-pearlite that originate from the austenite grain boundaries, and particularly inhibits bainite generation. Among these non-pearlite structures, bainite is the one that has the greatest adverse effect on drawability. Bainite accounts for 60% or greater of the non-pearlite structures. When solid-solute B is deficient, the foregoing effect is minimal, and when it is excessive, pearlite transformation is preceded by precipitation of coarse $Fe_{23}(CB)_6$ that degrades drawability.

This invention was achieved based on the foregoing findings.

The requirements of the invention will now be explained in detail.

Structure and mechanical properties of the wire rod:

A study connected by the inventors revealed that the drawability of a patented wire rod is correlated with the amount of non-pearlite structures such as pro-eutectoid ferrite, degenerate-pearlite and bainite and that restraining the volume fraction of these non-pearlite structures to less than 3% inhibits occurrence of early cracking and improves drawability during drawing. The present inventors further discovered that for reducing non-pearlite structures it is effective to add B, coil the hot-rolled steel in a temperature range not lower than Tmin shown below, and subject the coiled steel to patenting using a cooling method in which the cooling rate between 800 and 600° C. is 5° C./s or greater, Tmin being 800° C. when $B$(mass ppm)$-0.77 \times N$(mass ppm)$>0.0$, and Tmin being Tmin=950+1450/($B$(mass ppm)$-0.77 \times N$(mass ppm)$-10$)° C. when $B$(mass ppm)$-0.77 \times N$(mass ppm)$\leqq 0.0$ This enables manufacture of a high-strength wire rod excellent in drawability having a non-pearlite volume fraction of less than 3%. It should be noted that although pearlite block size depends on both austenite grain size and pearlite transformation temperature (on cooling rate in the case of continuous cooling), dependence on transformation temperature is predominant in the case of a rolled wire rod because extreme coarsening of austenite grain size does not readily occur. From this it follows that occurrence of pearlite block coarsening means that the transformation temperature is high (cooling rate is low). When the austenite grains coarsen, coarse non-pearlite structures occur to degrade drawability even if B is added. Moreover, even when the transformation temperature is too high, coarse B carbide forms at the austenite grain boundaries before pearlite transformation, thereby degrading drawability. On the other hand, when the transformation temperature is too low (cooling rate is too high), TS becomes too high and drawability is degraded as a result. The inventors found that a pearlite block size of not less than 20 μm and not greater than 45 μm inhibits occurrence of the aforesaid non-pearlite structures and coarse B carbide and also enables a suitable TS, thereby preventing degradation of drawability. From the viewpoint of descaling ability, the coiling temperature is preferably 950° C. or less.

Chemical Composition:

C: C is an element that effectively enhances the strength of the wire rod. However, at a content of less than 0.70 mass %, C cannot easily be made to reliably impart high strength of 2800 MPa or greater to the final product, while uniform pearlite structure becomes hard to achieve owing to promotion of pro-eutectoid ferrite precipitation at the austenite grain boundaries. When C content is excessive, reticulate pro-eutectoid cementite arising at the austenite grain boundaries causes easy breakage during wire drawing and also markedly degrades the toughness and ductility of the extra fine wire rod after the final drawing. C content is therefore defined as 0.70 to 1.10 mass %

Si: Si is an element that effectively enhances strength. It is also an element useful as a deoxidizer and, as such, is a required element when the invention is applied to a steel wire rod that does not contain Al. The deoxidizing action of Si is too low at a content of less than 0.1 mass %. When the Si content is excessive, it promotes pro-eutectoid ferrite precipitation even in a hypereutectoid steel and also causes a reduction in working limit during drawing. In addition, it hampers mechanical descaling (MD) in the drawing process. Si content is therefore defined as 0.1 to 1.5 mass %.

Mn: Like Si, Mn is also an element useful as a deoxidizer. It is further effective for improving hardenability and thus for enhancing wire rod strength.

Mn also acts to prevent hot brittleness by fixing S present in the steel as MnS. At a content of less than 0.1 mass % the aforesaid effects are not readily obtained. On the other hand, Mn is an element that easily precipitates. When present in excess of 1.0 mass %, it segregates particularly at the center region of the wire rod, and since martensite and/or bainite form in the segregation region, drawability is degraded. Mn content is therefore defined as 0.1 to 1.0 mass %.

Al: 0.01 mass % or less. In order to ensure that the Al does not generate hard, undeformable alumina nonmetallic inclusions that degrade the ductility and drawability of the steel wire, its content is defined as 0.01 mass % or less (including 0 mass %).

Ti: 0.01 mass % or less. In order to ensure that the Ti does not generate hard, undeformable oxide that degrades the ductility and drawability of the steel wire, its content is defined as 0.01 mass % or less (including 0 mass %).

N: 10 to 60 mass ppm. N in the steel forms a nitride with B and thus works to prevent austenite grain coarsening during heating. This action is effectively exhibited at an N content of 10 mass ppm or greater. At too high an N content, however, nitrides form excessively to lower the amount of solid-solute B present in the austenite. In addition, solid-solute N is liable to promote aging during wire drawing. The upper limit of N content is therefore defined as 60 mass ppm.

B: between 5 mass ppm or (0.77×N (mass ppm)–17.4) mass ppm and 50 mass ppm. When B is present in austenite in solid solution, it segregates at the grain boundaries and inhibits precipitation of ferrite, degenerate-pearlite, bainite and the like at the grain boundaries. On the other hand, excessive B addition has an adverse effect on drawability because it promotes precipitation of coarse carbide, namely $Fe_{23}(CB)_6$, in the austenite. The lower limit of B content is therefore defined as 5 mass ppm or (0.77×N (mass ppm)−17.4) mass ppm, whichever is greater, and the upper limit is defined as 50 mass ppm.

The contents of the impurities P and S are not particularly defined, but from the viewpoint of achieving good ductility, the content of each is preferably 0.02 mass % or less, similarly to in conventional extra fine steel wires.

Although the steel wire rod used in the present invention has the aforesaid elements as its basic components, one or more of the following optional additive elements can be positively included in addition for the purpose of improving strength, toughness, ductility and other mechanical properties:

Cr: 0.03 to 0.5 mass %, Ni: 0.5 mass % or less, Co: 0.5 mass % or less, V: 0.03 to 0.5 mass %, Cu: 0.2 mass % or less, Mo: 0.2 mass % or less, W: 0.2 mass % or less, and Nb: 0.1 mass % or less (where the content ranges of Ni, Co, Cu, Mo, W and Nb do not include 0 mass %). Explanation will now be made regarding these elements.

Cr: 0.03 to 0.5 mass %. As Cr reduces lamellar spacing, it is an effective element for improving the strength, drawability and other properties of the wire rod. For taking full advantage of these effects, Cr is preferably added to a content of 0.03 mass % or greater. At an excessive content, however, Cr prolongs the time to completion of transformation, thus increasing the likelihood of the occurrence of martensite, bainite and other undercooled structures in the hot-rolled wire rod, and also degrades mechanical descaling ability. The upper limit of Cr content is therefore defined as 0.5 mass %.

Ni: 0.5 mass % or less. Ni does not substantially contribute to wire rod strength improvement but is an element that enhances toughness of the drawn wire. Addition of 0.1 mass % or greater of Ni is preferable for effectively enabling this action. At an excessive content, however, Ni prolongs the time to completion of transformation. The upper limit of Ni content is therefore defined as 0.5 mass %.

Co: 1 mass % or less. Co is an element effective for inhibiting precipitation of pro-eutectoid cementite in the rolled product. Addition of 0.1 mass % or greater of Co is preferable for effectively enabling this action. Excessive addition of Co is economically wasteful because the effect saturates. The upper limit of Co content is therefore defined as 0.5 mass %.

V: 0.03 to 0.5 mass %. V forms fine carbonitrides in austenite, thereby preventing coarsening of austenite grains during heating and improving ductility, and also contributes to post-rolling strength improvement. Addition of 0.03 mass % or greater of V is preferable for effectively enabling this action. However, when the V is added in excess, the amount of carbonitrides formed becomes too large and the grain diameter of the carbonitrides increases. The upper limit of V content is therefore defined as 0.5 mass %.

Cu: 0.2 mass % or less. Cu enhances the corrosion resistance of the extra fine steel wire. Addition of 0.1 mass % or greater of Cu is preferable for effectively enabling this action. However, when Cu is added in excess, it reacts with S to cause segregation of CuS at the grain boundaries. As a result, flaws occur in the steel ingot, wire rod etc. in the course of wire rod manufacture. To preclude this adverse effect, the upper limit of Cu content is defined as 0.2 mass %.

Mo: Mo enhances the corrosion resistance of the extra fine steel wire. Addition of 0.1 mass % or greater of Mo is preferable for effectively enabling this action. At an excessive content, however, Mo prolongs the time to completion of transformation. The upper limit of Mo content is therefore defined as 0.2 mass %.

W: W enhances the corrosion resistance of the extra fine steel wire. Addition of 0.1 mass % or greater of W is preferable for effectively enabling this action. At an excessive content, however, W prolongs the time to completion of transformation. The upper limit of W content is therefore defined as 0.2 mass %.

Nb: Nb enhances the corrosion resistance of the extra fine steel wire. Addition of 0.05 mass % or greater of Nb is preferable for effectively enabling this action. At an excessive content, however, Nb prolongs the time to completion of transformation. The upper limit of Nb content is therefore defined as 0.1 mass %.

Drawing Conditions:

By subjecting the steel wire rod according to the first aspect of this invention to cold drawing, there can be obtained a high-strength steel wire excellent in ductility that is characterized by having a tensile strength of 2800 MPa or greater. The true strain of the cold-drawn wire is 3 or greater, preferably 3.5 or greater.

EXAMPLES

The present invention will now be explained more concretely with reference to working examples. However, the present invention is in no way limited to the following examples and it should be understood that appropriate modification can be made without departing from the gist of the present invention and that all such modifications fall within technical scope of the present invention.

Steel billets of the compositions shown in Table 1 were heated and then hot rolled into 4 to 6 mm-diameter wire rods. The wire rods were coiled at a predetermined temperature and patented utilizing the Stelmor process.

Non-pearlite volume fraction measurement was conducted by embedding resin in an L-section of a rolled wire rod, polishing it with alumina, corroding the polished surface with saturated picral, and observing it with a scanning electron microscope (SEM). The region observed by the SEM was divided into Surface, ¼ D and ½D zones (D standing for wire diameter) and 10 photographs, each of an area measuring 50×40 μm, were taken at random locations in each zone at a magnification of ×3000. The area ratio of degenerate-pearlite portions including dispersed granular cementite, bainite portions including plate-like cementite dispersed with spacing of three or more times the lamellar spacing of surrounding pearlite portion, and pro-eutectoid ferrite portions precipitated along austenite were subjected to image processing and the value obtained by the analysis was defined as the non-pearlite volume fraction.

The pearlite block size was determined by embedding resin in an L-section of the wire rod, polishing it, using EBSP analysis to identify regions enclosed by boundaries of an orientation difference of 9 degrees as individual blocks, and calculating the average block size from the average volume of the blocks.

Each patented wire rod was cleared of scale by pickling and then used to prepare 10 wire rods of 4 m length imparted with a zinc phosphate coating by Bonde coating. The so-prepared rods were subjected to single-head drawing at an area reduction rate of 16 to 20% per pass using dice each having an approach angle of 25 degrees. Drawability was determined by averaging the values of the limit diameter and true strain at drawing fracture.

TABLE 1

| No. | | Chemical compositions (Mass % (except for B and N)) | | | | | | | | | | | | | | | |
|---|---|---|---|---|---|---|---|---|---|---|---|---|---|---|---|---|---|
| | | C | Si | Mn | P | S | B(ppm) | Al | Ti | N(ppm) | Cr | Mo | Ni | Cu | V | Co | W | Nb |
| 1 | Invention | 0.70 | 0.30 | 0.45 | 0.019 | 0.025 | 24 | 0.000 | 0.000 | 20 | — | — | — | — | — | — | — | — |
| 2 | Invention | 0.82 | 0.20 | 0.51 | 0.015 | 0.013 | 15 | 0.000 | 0.000 | 12 | 0.20 | — | — | — | — | — | — | — |
| 4 | Invention | 0.92 | 0.25 | 0.46 | 0.019 | 0.025 | 30 | 0.000 | 0.000 | 60 | — | — | 0.10 | — | — | — | — | — |
| 5 | Invention | 0.87 | 1.20 | 0.5 | 0.008 | 0.007 | 46 | 0.001 | 0.000 | 50 | 0.20 | — | — | — | — | — | — | — |
| 6 | Invention | 1.09 | 0.20 | 0.5 | 0.010 | 0.009 | 25 | 0.000 | 0.001 | 50 | 0.20 | — | — | 0.10 | — | — | — | — |
| 7 | Invention | 0.92 | 0.60 | 0.5 | 0.025 | 0.020 | 30 | 0.001 | 0.000 | 25 | — | — | — | — | — | — | 0.10 | 0.10 |
| 8 | Invention | 0.82 | 0.20 | 0.5 | 0.008 | 0.008 | 11 | 0.000 | 0.000 | 25 | — | — | — | — | — | — | — | — |
| 9 | Invention | 0.82 | 0.20 | 0.5 | 0.008 | 0.008 | 11 | 0.000 | 0.000 | 33 | — | — | 0.10 | — | — | — | — | — |
| 10 | Invention | 0.82 | 0.20 | 0.5 | 0.008 | 0.008 | 20 | 0.001 | 0.000 | 25 | — | — | — | — | — | — | — | — |
| 11 | Invention | 0.82 | 0.20 | 0.5 | 0.008 | 0.008 | 20 | 0.000 | 0.000 | 35 | — | — | — | — | — | — | — | — |
| A | Invention | 0.92 | 0.20 | 0.5 | 0.008 | 0.008 | 15 | 0.000 | 0.000 | 25 | 0.20 | — | — | — | 0.03 | — | — | — |
| B | Invention | 0.92 | 0.20 | 0.5 | 0.008 | 0.008 | 10 | 0.000 | 0.000 | 21 | 0.20 | — | — | — | 0.06 | — | — | — |
| C | Invention | 1.02 | 0.20 | 0.5 | 0.008 | 0.008 | 15 | 0.000 | 0.000 | 25 | 0.20 | — | — | — | 0.03 | — | — | — |
| D | Invention | 1.02 | 0.20 | 0.5 | 0.008 | 0.008 | 10 | 0.000 | 0.000 | 21 | 0.20 | — | — | — | 0.06 | — | — | — |
| E | Invention | 0.82 | 0.21 | 0.48 | 0.009 | 0.009 | 12 | 0.000 | 0.000 | 24 | 0.03 | — | — | — | — | — | — | — |
| F | Invention | 0.82 | 0.19 | 0.51 | 0.009 | 0.009 | 11 | 0.000 | 0.000 | 25 | 0.06 | — | — | — | — | — | — | — |
| G | Invention | 0.92 | 0.20 | 0.5 | 0.008 | 0.008 | 9 | 0.000 | 0.000 | 23 | 0.05 | — | — | — | 0.04 | — | — | — |
| H | Invention | 1.01 | 0.20 | 0.5 | 0.008 | 0.008 | 10 | 0.000 | 0.000 | 23 | 0.05 | — | — | — | 0.03 | — | — | — |
| I | Invention | 1.02 | 0.20 | 0.5 | 0.008 | 0.008 | 8 | 0.000 | 0.000 | 21 | 0.04 | — | — | — | — | — | — | — |
| 12 | Comparative | 0.70 | 0.30 | 0.6 | 0.008 | 0.007 | 11 | 0.000 | 0.000 | 35 | — | 0.20 | — | — | — | — | — | — |
| 13 | Comparative | 0.82 | 0.20 | 0.5 | 0.010 | 0.009 | 2 | 0.000 | 0.010 | 50 | 0.20 | — | — | — | — | — | — | — |
| 14 | Comparative | 0.90 | 0.20 | 0.8 | 0.010 | 0.009 | 60 | 0.000 | 0.005 | 25 | — | — | 0.10 | — | — | — | — | — |
| 15 | Comparative | 0.87 | 1.70 | 0.4 | 0.015 | 0.013 | 20 | 0.000 | 0.010 | 25 | 0.20 | — | — | — | — | — | — | — |
| 16 | Comparative | 1.30 | 1.00 | 0.3 | 0.015 | 0.013 | 20 | 0.030 | 0.000 | 25 | — | — | — | — | — | 0.30 | — | — |
| 17 | Comparative | 0.92 | 0.30 | 1.5 | 0.015 | 0.013 | 20 | 0.000 | 0.000 | 25 | — | — | — | — | 0.20 | — | — | — |
| 18 | Comparative | 0.82 | 1.00 | 0.5 | 0.025 | 0.020 | 20 | 0.030 | 0.000 | 35 | — | — | — | — | 0.20 | — | — | — |
| 19 | Comparative | 0.96 | 0.20 | 0.5 | 0.010 | 0.009 | 0 | 0.000 | 0.010 | 25 | 0.20 | — | — | 0.10 | — | — | — | — |
| 20 | Comparative | 0.82 | 0.20 | 0.5 | 0.010 | 0.009 | 0 | 0.000 | 0.010 | 25 | — | — | — | — | — | — | — | — |
| 21 | Comparative | 0.82 | 0.20 | 0.5 | 0.010 | 0.009 | 13 | 0.000 | 0.010 | 25 | — | — | — | — | — | — | — | — |
| 22 | Comparative | 0.82 | 0.20 | 0.45 | 0.019 | 0.025 | 24 | 0.000 | 0.000 | 25 | — | — | — | — | — | — | — | — |

TABLE 2

| No. | Diameter (mm) | Coiling or heating temp (° C.) | Patenting method | Cooling rate (° C./s) | Patented product strength (MPa) | Pearlite block size (μm) | Reduction of area (%) | Tmin (° C.) | RA min (%) | Non-pearlite area ratio (%) | Drawing fracture diameter (mm) | Drawing fracture true strain | Remark |
|---|---|---|---|---|---|---|---|---|---|---|---|---|---|
| 1 | 5.5 | 860 | Stelmor | 11 | 1077 | 30 | 61 | 800 | 41 | 1.2 | 1.9 | 2.1 | |
| 2 | 5.5 | 880 | Stelmor | 11 | 1185 | 32 | 56 | 800 | 43 | 2.4 | 2.6 | 1.5 | |
| 4 | 5.5 | 930 | Stelmor | 11 | 1277 | 43 | 55 | 895 | 37 | 2.5 | 2.9 | 1.3 | |
| 5 | 5.0 | 850 | Stelmor | 12 | 1375 | 22 | 41 | 800 | 47 | 2.5 | 2.8 | 1.2 | |
| 6 | 4.0 | 910 | Stelmor | 14 | 1442 | 37 | 38 | 888 | 35 | 2.8 | 2.4 | 1.0 | |
| 7 | 6.0 | 870 | Stelmor | 10 | 1324 | 29 | 56 | 800 | 44 | 2.8 | 2.9 | 1.5 | |
| 8 | 5.5 | 880 | Stelmor | 12 | 1196 | 28 | 55 | 871 | 45 | 1.3 | 2.7 | 1.4 | |
| 9 | 5.5 | 900 | Stelmor | 12 | 1203 | 35 | 56 | 891 | 41 | 2.2 | 2.7 | 1.4 | |
| 10 | 5.5 | 870 | Stelmor | 11 | 1169 | 24 | 57 | 800 | 46 | 2.1 | 2.4 | 1.7 | |
| 11 | 5.5 | 875 | Stelmor | 13 | 1196 | 31 | 54 | 864 | 43 | 1.9 | 2.6 | 1.5 | |
| A | 5.5 | 870 | Stelmor | 13 | 1274 | 32 | 49 | 848 | 43 | 1.9 | 2.9 | 1.3 | |
| B | 5.5 | 870 | Stelmor | 13 | 1274 | 27 | 51 | 860 | 46 | 1.7 | 2.9 | 1.3 | |
| C | 5.5 | 870 | Stelmor | 13 | 1353 | 30 | 41 | 848 | 43 | 1.7 | 2.9 | 1.3 | |
| D | 5.5 | 870 | Stelmor | 13 | 1353 | 28 | 46 | 860 | 44 | 1.5 | 2.9 | 1.3 | |
| E | 5.5 | 870 | Stelmor | 13 | 1195 | 31 | 44 | 862 | 43 | 1.6 | 2.8 | 1.3 | |
| F | 5.5 | 875 | Stelmor | 13 | 1196 | 32 | 45 | 871 | 43 | 1.8 | 2.9 | 1.3 | |
| G | 5.5 | 875 | Stelmor | 13 | 1274 | 29 | 46 | 873 | 45 | 2.1 | 2.9 | 1.3 | |
| H | 5.5 | 875 | Stelmor | 14 | 1345 | 32 | 46 | 868 | 42 | 2.0 | 2.9 | 1.3 | |
| I | 5.5 | 875 | Stelmor | 13 | 1353 | 35 | 42 | 870 | 40 | 1.6 | 3.0 | 1.2 | |
| 12 | 5.5 | 850 | Stelmor | 10 | 1128 | 30 | 33 | 894 | 43 | 3.5 | 3.7 | 0.8 | |
| 13 | 5.5 | 870 | Stelmor | 10 | 1169 | 34 | 39 | 919 | 42 | 4.5 | 3.4 | 1.0 | |
| 14 | 5.5 | 860 | Stelmor | 11 | 1270 | 38 | 56 | 800 | 40 | 3.9 | 3.5 | 0.9 | pro-eutectoid θ |
| 15 | 5.5 | 870 | Stelmor | 12 | 1435 | 36 | 28 | 800 | 36 | 12.6 | 4.0 | 0.7 | pro-eutectoid α |
| 16 | 5.5 | 870 | Stelmor | 11 | 1657 | 32 | 23 | 800 | 22 | 4.7 | 4.1 | 0.6 | pro-eutectoid θ |
| 17 | 5.5 | 860 | Stelmor | 12 | 1352 | 26 | 39 | 800 | 45 | 3.8 | 3.6 | 0.8 | micro-martensi |
| 18 | 5.5 | 820 | Stelmor | 11 | 1305 | 22 | 39 | 864 | 49 | 8.2 | 3.3 | 1.0 | |
| 19 | 5.5 | 905 | Stelmor | 11 | 1306 | 36 | 42 | 900 | 40 | 3.6 | 4.1 | 0.4 | No B |
| 20 | 5.5 | 905 | Stelmor | 11 | 1186 | 32 | 41 | 900 | 43 | 3.4 | 3.1 | 1.1 | No B |
| 21 | 5.5 | 885 | Stelmor | 40 | 1316 | 16 | 33 | 861 | 51 | 2.7 | 3.9 | 1.0 | Fast cool |
| 22 | 5.5 | 880 | Air | 2 | 1020 | 52 | 28 | 870 | 31 | 2.7 | 3.1 | 0.6 | Slow cool |

Table 1 shows the chemical compositions of the evaluated products, and Table 2 shows their test conditions, austenite grain diameter and mechanical properties.

In Tables 1 and 2, 1 to 11 and A to I are invention steels and 12 to 22 are comparative steels.

12 and 18 are cases in which reduction of area was low because a low coiling temperature caused B nitride and carbide to precipitate before patenting and thus make it impossible to obtain adequate solid-solute B. 13, 19 and 20 are cases in which reduction of area was low because the amount of added B was either low or nil. 14 is a case in which reduction of area was low because excessive B content caused heavy precipitation of B carbide and pro-eutectoid cementite at the austenite grain boundaries. 15 is a case in which pro-eutectoid ferrite precipitation could not be inhibited because Si content was excessive. 16 is a case in which pro-eutectoid cementite precipitation could not be inhibited because C content was excessive. 17 is a case in which micro-martensite formation could not be inhibited because Mn content was excessive. 21 is a case in which ductility was poor because an excessively high cooling rate during patenting made TS high for the C content. The high cooling rate refined the block size. 22 is a case in which ductility was poor because a low cooling rate during patenting coarsened the block size.

FIG. 1 is a diagram showing how average true strain at fracture by drawing varied as a function of non-pearlite area ratio in invention and comparative steels. The invention steels were high in average true strain at fracture and exhibited good drawability. However, drawing limit also depends on TS. How average true strain at fracture by drawing varied as a function of tensile strength is therefore shown in FIG. 2. A comparison of the invention and comparative steels at the same TS shows that the invention steels were higher in average true strain and exhibited superior drawability. FIG. 3 relates to those among the steel wire rods having chemical compositions and heating conditions falling within the ranges of the present invention that were examples whose TS was within the range of 1000 to 1300 MPa. The diagram shows how average true strain at fracture by drawing varied as a function of pearlite block size. Superior drawability was exhibited when pearlite block size was in the range of not less than 20 μm and not greater than 45 μm.

Figure 2:
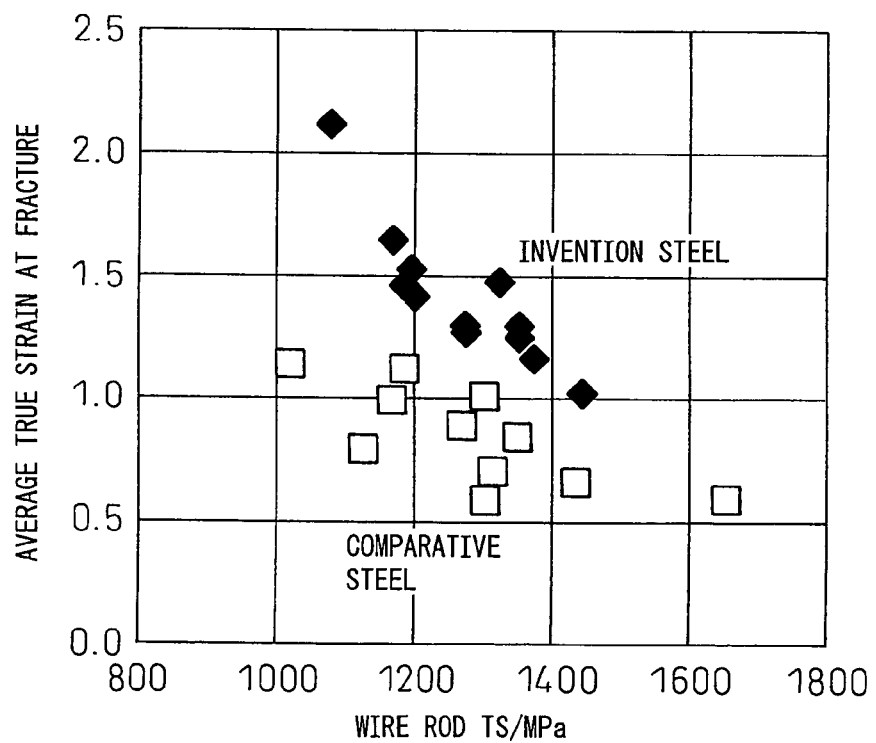
FIG. 2 is a diagram showing how average true strain at fracture by drawing varied as a function of tensile strength.

In FIGS. 1 to 3, ♦ indicates an invention steel and □ represents a comparative steel.

This invention enables manufacture of steel cord usable as a reinforcing material in, for example, radial tires, various types of industrial belts, and the like, and also of rolled wire rod suitable for use in applications such as sewing wire.

What is claimed is:

1. A high-strength steel wire rod comprising a pearlite structure of an area ratio of 97% or greater not including 100% and a balance of non-pearlite structures including one or more of bainite, degenerate-pearlite and pro-eutectoid ferrite, and having a pearlite block size of not less than 20 μm and not greater than 45 μm, produced by a process comprising:
   hot rolling a steel billet comprising in mass %,
   C: 0.70 to 1.10%,
   Si: 0.1 to 1.5%,
   Mn: 0.1 to 1.0%,
   Al: 0.01% or less,
   Ti: 0.01% or less,
   N: 10 to 60 mass ppm,
   B: not less than (0.77×N (mass ppm)−17.4) mass ppm or 5 mass ppm, whichever is greater, and not greater than 52 mass ppm, and the balance of Fe and unavoidable impurities,
   coiling the hot-rolled steel in the temperature range between Tmin shown below and 950° C.,
   subjecting the coiled steel to patenting using a cooling method in which a cooling rate between 800 to 600° C. is 5° C./s or greater,
   Tmin being 800° C. when B (mass ppm)−0.77×N(mass ppm)>0.0, and
   Tmin being Tmin =950+1450/(B (mass ppm)−0.77×N (mass ppm)−10)° C. when B(mass ppm)−0.77×N(mass ppm)≦0.0.

2. A high-strength steel wire rod according to claim 1, further comprising, in mass %, one or more elements selected from the group consisting of:
   Cr: 0.03 to 0.5%,
   Ni: 0.5% or less (not including 0%),
   Co: 0.5% or less (not including 0%),
   Cu: 0.2% or less (not including 0%), and
   Mo: 0.2% or less (not including 0%).

3. A high-carbon steel wire, which is manufactured by subjecting the steel wire rod of claim 1 or 2 to intermediate patenting and cold drawing and has a tensile strength (TS) of 2800 MPa or greater.

4. A high-strength steel wire rod according to claim 1, further comprising, in mass %, V: 0.03 to 0.5%.

5. A high-strength steel wire rod according to claim 1, further comprising, in mass %, W: 0.2% or less (not including 0%).

6. A high-strength steel wire rod according to claim 1, further comprising, in mass %, Nb: 0.1% or less (not including 0%).

7. A high-strength steel wire rod according to claim 1, further comprising, in mass %, two or more elements selected from the group consisting of V: 0.03 to 0.5%, W: 0.2% or less (not including 0%), and Nb: 0.1% or less (not including 0%).

* * * * *